(12) United States Patent  (10) Patent No.: US 9,348,510 B2
Cohen et al.  (45) Date of Patent: May 24, 2016

(54) COMPARING USERS HANDWRITING FOR DETECTING AND REMEDIATING UNAUTHORIZED SHARED ACCESS

(71) Applicant: Clareity Security, LLC, Scottsdale, AZ (US)

(72) Inventors: Matthew Cohen, Minneapolis, MN (US); Bharat Gadher, Moncton (CA); Ted Gueniche, Moncton (CA); John-Daniel Maguire, Moncton (CA)

(73) Assignee: Clareity Security, LLC, Scottsdale, AZ (US)

( * ) Notice: Subject to any disclaimer, the term of this patent is extended or adjusted under 35 U.S.C. 154(b) by 0 days.

(21) Appl. No.: 14/322,593

(22) Filed: Jul. 2, 2014

(65) Prior Publication Data

US 2016/0004422 A1    Jan. 7, 2016

(51) Int. Cl.
*G06K 9/00* (2006.01)
*G06F 3/0488* (2013.01)
*G06T 7/00* (2006.01)

(52) U.S. Cl.
CPC ........ *G06F 3/04883* (2013.01); *G06K 9/00161* (2013.01); *G06K 9/00167* (2013.01); *G06T 7/0044* (2013.01); *G06T 2207/10004* (2013.01); *G06T 2207/20148* (2013.01)

(58) Field of Classification Search
CPC .......... G06F 3/04883; G06K 9/00161; G06K 9/00167; G06T 2207/10004; G06T 2207/20148; G06T 7/0044
USPC .......................................................... 382/119
See application file for complete search history.

(56) References Cited

U.S. PATENT DOCUMENTS

2014/0283005 A1* 9/2014 Avni ................. G06F 21/64 726/16
2015/0278492 A1* 10/2015 Tungare ............ G06F 21/31 726/19

* cited by examiner

*Primary Examiner* — Manuchehr Rahmjoo
(74) *Attorney, Agent, or Firm* — Etherton Law Group, LLC

(57) ABSTRACT

A method of using handwriting input on a touch screen device to verify the identity of a user. The user writes a profile word in an input space provided on the touch screen. Features of the handwriting are captured and sent to a server, which stores the data in a data record associated with the authorized user. When a user subsequently writes a challenge word, the handwriting features of the challenge word are compared to the authorized user's handwriting data record and given a rating of similarity. If the rating is within a prescribed range, the user's identity is verified as being the authorized user and permitted to access a given asset. If not, the user's identity is not verified and that user may be denied access to the asset or other action taken. This biometric feature of authentication may be used alone or in a multi-factor authentication environment.

7 Claims, 2 Drawing Sheets

COMPARING USERS HANDWRITING FOR DETECTING AND REMEDIATING UNAUTHORIZED SHARED ACCESS

FIELD OF INVENTION

This invention relates generally to method of comparing users' handwriting. It relates more particularly to comparing users' handwriting to authenticate users and to detect and remediate unauthorized shared access.

BACKGROUND

Authentication is the process of verifying the identity of a user who wishes to access a given virtual or physical asset, such as computer network, software application, bank account or room in a building. The three most common authentication methods are knowledge-based, token-based, and biometrics-based. For example, a user of a computer application typically authenticates ("logs in") using the knowledge-based method by typing in a unique user identifier ("userid" or "username") and a corresponding password that supposedly only he knows to verify his identity. Knowledge-based authentication has been widely employed because of its ease of use and ease of changing the user identifier and password. However, passwords are easily lost, stolen or shared and, because of that, knowledge-based authentication tends to verify who knows the password, not the identity of the user.

Token-based authentication uses physical keys, comparing data from a physical device that a user owns, referred to as a token, such as a smartphone, smartcard, or hardware device that provides a one-time-use password that changes periodically. However, tokens are also easily lost, stolen or shared and, because of that, token-based authentication tends to verify who possesses the device, not the identity of the user.

Biometrics-based mechanisms use unique physiological characteristics such as fingerprints, voice and iris patterns, which are very difficult to steal or share. But biometric authentication suffers the disadvantage of requiring sophisticated hardware and software technology to measure the biometric factor on every device that requires authentication for access, an expensive proposition.

As a result of the deficiencies on the various authentication methods, it is often difficult to have a high degree of confidence that the user accessing an asset is the user who was given authorization from the asset holder. In some cases, not only is the user not the authorized user, but there may be several users using the authentication words or tokens that supposedly belong to only the authorized user. This results in unauthorized shared access which can lead to data breaches to unauthorized third parties and lost revenue in situations where the access is based on a user fee per authorized user.

One common method to improve the confidence in authentication is to rely on multi-factor authentication, for example combining a password (knowledge-based authentication) with a given smartphone (token-based authentication), thus increasing the likelihood that the user who is entering the authentication factors is the authorized user.

Recently there has been increased adoption of computing devices that include a touch screen: a display that provides an interface for interacting with the computer by touching the screen and capturing the location and timing of the touches as data for processing by the computer operating system and applications. Some devices also capture the pressure of the touch upon the screen. The availability of this data creates an opportunity to use handwriting as a biometric behavioral mechanism as a part of multi-factor authentication without the complications of more sophisticated and uncommon biometric hardware.

Therefore, it is an object of this invention to provide a method of authentication using handwriting. It is another object of this invention to provide a method of authentication using handwriting as part of multi-factor authentication. It is a further object to provide a method that uses handwriting to detect unauthorized sharing of authentication factors.

SUMMARY OF THE INVENTION

A method is presented of using handwriting input on a touch screen device to verify the identity of a user. A profile of the user's handwriting is obtained. In one embodiment a profile word is displayed to the user. The user then, using a stylus or finger, writes that profile word in an input space provided on the touch screen. One or more features of the handwriting is captured and sent to a server. The server stores the captured handwriting features in a data record associated with the user. The record may be updated with subsequent samples of the user's handwriting. When a second user subsequently writes a challenge word, the handwriting features of the challenge word are compared to the first user's handwriting data record and given a rating of similarity. In a preferred embodiment, the comparison and rating are determined using a clustering algorithm. If the rating is within a prescribed range, the user's identity is verified as having accessed the asset before. If the rating is not within a prescribed range, the user's identity is not verified. In a preferred embodiment, the first user is an authorized user and the failure of a second user's signature to meet a given rating means that the second user is not authorized. Consequently, the second user may be denied access to the asset or other action taken. This biometric component of authentication may be used alone or in combination with other authentication factors in a multi-factor authentication environment.

DETAILED DESCRIPTION OF THE INVENTION

Methods are presented of using handwriting input on a touch screen device to verify the identity of a user. In a preferred embodiment the touch screen is an input device that captures the location and timing of the touches on the touch screen. Preferably the touch screen device also captures the pressure of the touch upon the screen. The handwriting input can be made with a stylus or the user's finger. The touch screen device may be a touch screen of a touch screen display, like those of the iPad®, KindleFire®, and newer smartphones, or stand-alone devices such as signature pads associated with credit card authorization devices. Preferably the touch screen is used in combination with a visual display or audio speaker, separately or integrally. As used herein, display refers to either video or audio, or both unless otherwise expressly identified as one or the other.

Figure 1:
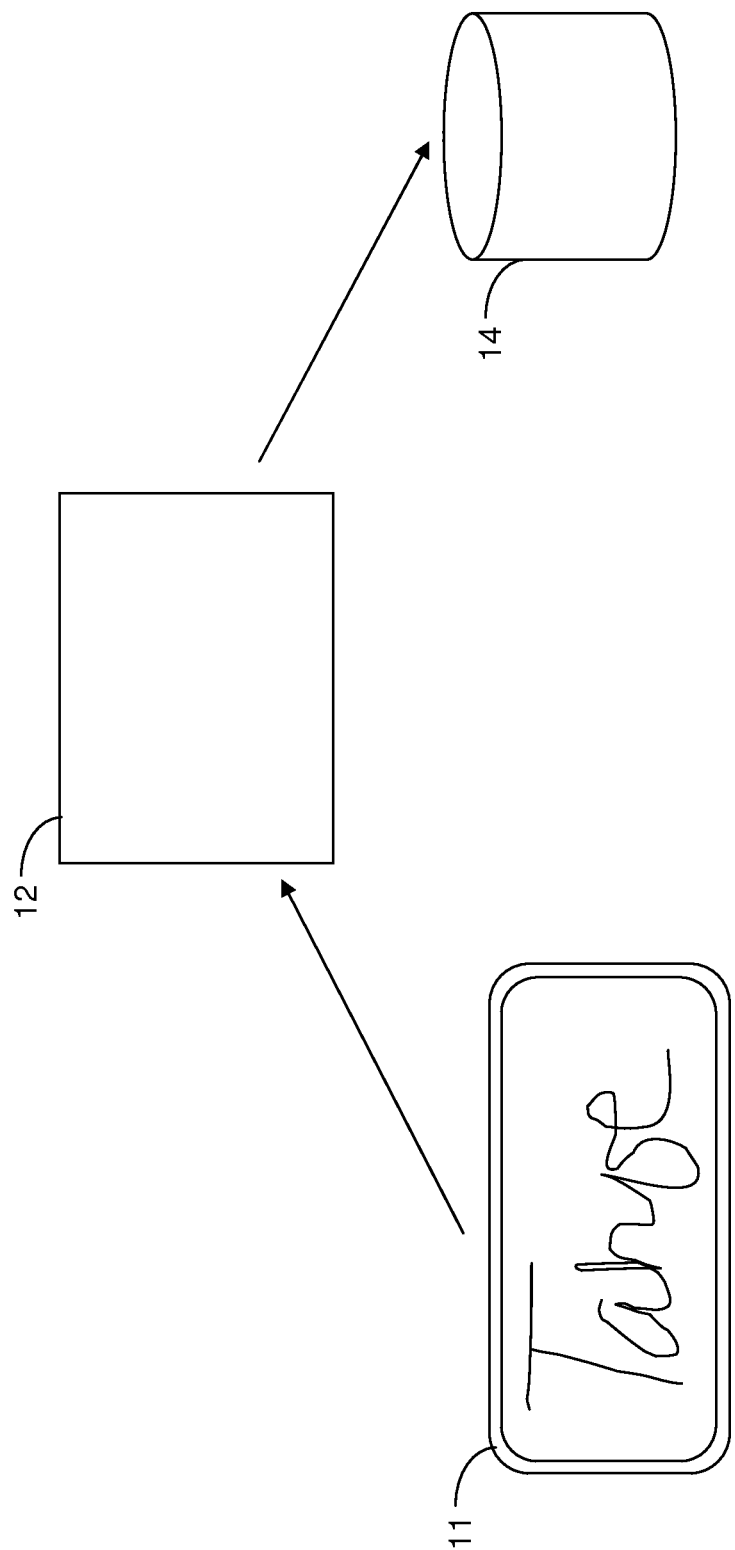
FIG. 1 is a schematic illustration of the system executing the invention.

As the user writes on the touch screen 11, the input is translated into digital data. A collection of the user's handwriting samples is collected from the touch screen input from multiple samples taken at about the same time during the creation of an initial handwriting profile or as a result of multiple samples taken at separate times. The user's handwriting is preferably what the user commonly uses, whether it is cursive (connected letters), print (separated letters), or a combination of both. Once the handwriting data from the user is captured it is sent to a server 12 and stored in a data record 14 associated with the user. See FIG. 1. It may be stored in its raw form or a manipulated form, or both.

In one embodiment, the samples are made as a user writes a word or multiple words presented to the user on the display. Each word presented to a user for the collection of handwriting samples is referred to herein as a profile word. The profile word may be presented audibly or visually. Preferably each profile word is presented by visually displaying it as a printed typeface alphanumeric word.

In some embodiments the profile word is a word familiar to the user, such as his name. For more secure implementations, a word from a library will be used because it is more difficult for a user to share his method of writing of all letters and combinations of letters than it is to share his method of writing just his name. In the word library case, words will initially be presented in an order that builds a profile for handwriting analysis, with common initial and ending letters and letter groupings along with additional letters and letter groupings over time. For example, "Totally" may be followed by "Trolly", "Trellis", "Telling", "Tingle", and so forth. Subsequently one or more words for which letter and grouping pattern profiles have been established may be chosen at random from a dictionary or pre-selected based on letter complexity.

Handwriting can be subdivided into a number of features including, for example:

- x/y coordinates of strokes, identifying, e.g., letter shape and formation, including characteristic mixture of printing and cursive, characteristic shapes of initial and terminal strokes, and letter embellishments such as dot, dash circles to dot "i"s or a lack of diacritics; method of crossing "t"s, ticks, eyelets, small loops, and flourishes and iota consistency
- stroke count, lengths, alignment, lifts and separations
- letter slant
- pressure used for strokes and parts of strokes
- letter spacing including connecting strokes (ligatures)
- relative letter proportions and size
- center of mass
- direction changes
- order of strokes
- timing and speed of strokes, including pauses and stops In some embodiments only a subset of possible handwriting features is measured and stored. For example, in one embodiment only the "order of strokes" and "timing and speed of strokes" features are measured and stored. The "order of strokes" and "timing and speed of strokes" elements are unique to touch screen data capture, because such features are unknown when analyzing handwriting after it has been already written on paper. As an example of using stroke and timing information, consider the lowercase print letter "y." One user will first start in the upper left, draw a symmetrical "v", then retrace the right part of the "v" downward and continue a straight line into the descender of the "y" below the letter baseline. A second user will draw the short right part of the "y" from top to bottom, then start from the top-left and draw the rest of the letter culminating in the descender. A third user will draw the long stroke before the short stroke. A fourth user will start the short stroke beginning from the existing short line and complete it at the meanline. These differences would not be apparent from the analysis of a writing on paper because the timing of the stokes cannot be determined after the letter is written, only while it is being written.

Because a user does not write a word identically each time, even when writing the same word over and over, simply trying to match a first set of input data to a second set of input data would not be useful to determine whether the first and second data sets came from the first person. Such first and second input from a first user would never naturally match identically, and first and second sets of data that do match would most likely be due to a cut-and-paste input or other non-human entry. Both results are inadequate to differentiate between a first user and a second user. Therefore, to determine whether a handwriting profile of a second user is from a first user, this method employs a mathematical representation of the data to make a comparison between the data from the first and second users.

In one embodiment, the mathematical representation of the data employs a pseudo-clustering algorithm to find a cluster or set of clusters that defines a first user's writing. Cluster analysis or clustering is the task of grouping a set of objects in such a way that objects in the same group (a cluster) are more similar (in some sense or another) to each other than to those in other groups (clusters). A cluster is a set of data points that are extremely similar, or a single point that is not similar to any other pattern. There are many types of clustering algorithms including centroid-based clustering, distribution-based clustering (similar to Gaussian distribution), and density-based clustering. The measure of similarity is the distance between the center of each cluster and the given data point. These distances (similarities) can be based on a single dimension or multiple dimensions, with each dimension representing a feature of the handwriting. If there are only two or three features, this measure is the actual geometric distance between clusters in the space (i.e., as if measured with a ruler). Euclidean distances are computed to determine distances between clusters in a multi-dimensional space.

Each instance of a handwriting feature can be characterized as a data point and can be compared to a cluster comprising that handwriting feature. Comparing a user's handwriting feature to a cluster enables the system to determine whether the user's handwriting falls within the cluster and therefore indicates whether the user is one who has signed before. In the case where the user who signed earlier is known to be authorized, the subsequent user would be considered authorized.

Figure 2:
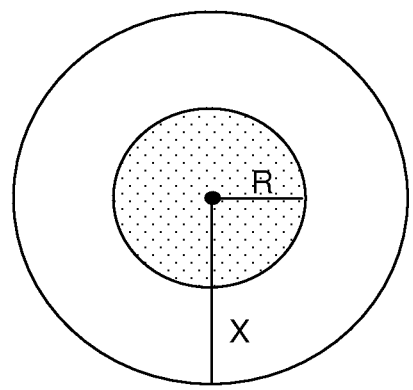
FIG. 2 illustrates a one-point cluster and its surrounding pattern.
Figure 3:
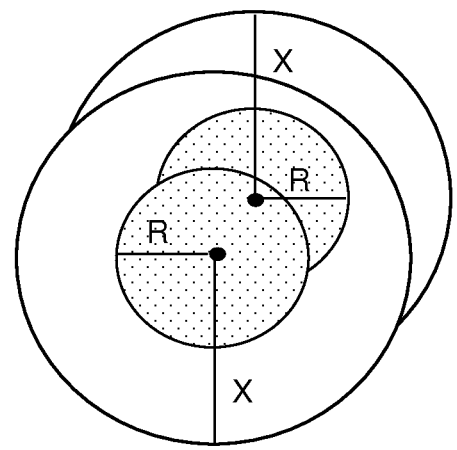
FIG. 3 illustrates a two-point cluster and its surrounding pattern.

A diagram of a one-point cluster is shown in FIG. 2 for simplicity, but in the real system even one-point clusters are non-spherical in Euclidean space, and patterns may be multi-dimensional. A representation of a two-point cluster is seen in FIG. 3. In general, a clustering algorithm uses the following logic when receiving a data point submission S:

1. Find the distance from S to each known pattern
   a. Distance to a pattern is defined as the closest point
2. If there exists no retrieved distance below X, create S as its own cluster
3. Else take the closest cluster C (which corresponds to pattern P)
   a. If the distance is more than R, we call S a relative of C and assign a confidence of "Medium" to belong to P.
   b. Else if the size of the cluster is "small enough", we integrate P into the cluster and return a "High" confidence for it belonging to P.
   c. Else return a "High" confidence for it belonging to P.

Additional methods may be used to improve the clustering reliability including using a Naïve-Bayes classifier on feature differences vector and using a Mahalanobis distance on the feature differences vector. The Mahalanobis differs from Euclidean distance in that it takes into account the correlations of the data set and is scale-invariant. In other words, it has a multivariate effect size. Other methods involve re-clustering, reseeding a cluster's core, and defining an R per cluster as the clusters get large enough.

Once the authorized user's handwriting profile is defined by a set of clusters, another user's data input can be compared to the profile to determine whether the input is from an authorized user. To determine if another user is an authorized user, the user is presented a challenge word. The user writes the challenge in the touch screen input area, the input data is sent to a server and compared to the authorized user's data record. The comparison is given a rating of similarity, where the similarity is the distance of the data feature vector to the authorized user's handwriting cluster. If the rating is within a prescribed range, the user's identity is verified and permitted to access a given virtual or physical asset. If the rating is not within a prescribed range, the user's identity is not verified and the user may be denied access to the asset or other action taken. This biometric component of authentication may be used alone or in combination with other authentication factors in a multi-factor authentication environment.

The method can be used to determine if unauthorized shared access is occurring. For example, assume an authorized user has been given a username and password. Only that single authorized user is permitted to use that username/password pair. However, it is noticed that that username/password pair is often entered from different IP addresses daily, and at times that do not generally correspond to normal usage times. To determine whether the username/password pair is being used by only the authorized user or by unauthorized users, an additional authorization factor is presented to the suspect user. After the suspect user has entered the username/password pair, the suspect user is presented with a challenge word, TAHOE, and asked to hand-write the word in the bounded box of the touch screen. The input is translated into digital data and sent to a server to be compared to the authorized user's handwriting data record. Features of the suspect user's input are compared to the clusters of the authorized user's data record. If the comparison reveals that the suspect user's signature does not adequately compare to the authorized user's signature, the suspect user may be denied access to the asset or other action taken.

In a second example, the method is used to detect sharing. For a given account, a pattern is formed from a set of at least 5 similar logins. The account is allowed a number of patterns, for example 3, 4, or 5 patterns. The account is reviewed after the first 10 successful logins and then every 5 logins thereafter to determine the number of patterns used to login to the account. To be considered shared the account meets one or more of these criteria:

the account has 2 or more patterns in excess of the allowed number of patterns
at least 2 of the patterns have 7 or more logins each
at least 2 patterns are distinctly different Upon determining that the account is shared, it may enter remediation. Remediation may include on or more actions such the user can be notified that his login does not match to another user's login; the owner of the account can be notified that a user tried to access the asset whose login didn't favorably compare to existing patterns; the user can be denied access to the account for a given period of time or from a specific IP address; or all users can be denied access to the asset. Alternatively, no action might be taken, other than continued login data collection. The account may exit remediation after a certain event. Such events include no additional patterns added during a given period of time or no access attempted during a given period of time.

In a third example a user's account for accessing real estate software has three logon signature patterns associated with it, A, B, and C, where each signature pattern represents an associated set of highly similar signatures. Each signature pattern can be mathematically represented as a cluster, thus each pattern A, B, C is a cluster a, b, c. In this example, each cluster is a function of 16 signature features and thus each cluster is considered 16D, or 16 dimensional. See Table 1. A new signature is used to logon to the user's account, and the system is asked to find which cluster the new signature belongs to. To do this the new signature is compared to each cluster, a, b and c, as follows:

1. Each of the 16 features of the new signature is compared to the corresponding feature of each cluster, and the differences form a feature set (F). This produces a set of 16 vectors, one vector per feature in each cluster. Each feature is a unit metric and each dimension in the vector is unit metric distance between the new signature and a signature in the given cluster. With each of the 16 vectors vector (D), the differences are multiplied by weights (W) and a normalized Euclidean distance is calculated:

$$\frac{\sqrt{\sum_{i \in F} (D_i * W_i)^2}}{\|F\|}$$

This is referred to as a normalized weighted-Euclidean distance over a set of feature differences or a metric over multiple metric spaces.

2. The previous step gives us a set of 1D vectors (one per signature in each cluster). Each of these vectors indicates how far the new signature is from the given cluster. The shortest distance corresponds to the signature most like a cluster.
3. The distance will be between 0 and 1.
   a. If the distance is 0, it means the new signature is identical or near identical to another signature for that user. In such case the rating of similarity is high. The system may indicate that by displaying, for example, DUPLICATE, meaning that there is a high confidence that the new signature is a mechanical copy of a signature used to logon earlier.
   b. If the distance is not zero but below a pre-defined value E, this indicates the new signature is highly similar to other signatures in the cluster. The system may indicate that by displaying, for example, HIGH CONFIDENCE, meaning "There is a high confidence that the new signature is by a person who has logged on before.
   c. If the distance is not zero but below a different pre-defined value Y (for example, Y<=2E), this indicates that the new signature is similar to other signatures in the cluster. The system may indicate that by displaying, for example, MEDIUM CONFIDENCE, meaning "There is a medium confidence that the new signature is by a person who has logged on before."
   d. If the distance is not zero but below a different pre-defined value Y (for example, Y>2E), this indicates that the new signature is not very similar to other signatures in the cluster. The system may indicate that by displaying, for example, LOW CONFIDENCE, meaning "There is a low confidence that the new signature is by a person who has logged on before."

If the new signature rating is "Low Confidence" for belonging to all clusters, it constitutes a new cluster by itself and the account would get a fourth pattern. If the signature is highly confident to belong to one pattern, it may join the underlying cluster.

Table 1 presents the handwriting features captured in a preferred embodiment:

TABLE 1

| Feature | Description of what is compared |
|---|---|
| Coefficient of Variance | Compares the coefficients of variance ("CoV") between signatures, where the CoV is the dispersion rate of a signature around its "center-of-mass," or the intersection of the average X coordinate and average Y coordinate. |
| Stop Time | Compares the total stop time (time between strokes and negligible speed) of two signatures |
| Total Time | Compares the total writing time (end point's time minus start point's time) |
| Direction Changes | Compares the number of direction changes in signatures |
| Direction Histogram | Compares the frequency of directions in signatures' writing paths |
| Iota Consistency | Compares the dots and slashes of signatures, e.g., cross on 't', dot on 'i' |
| Stroke Count | Compares number of strokes |
| Stroke Lengths | Compares length of strokes |
| Ratio Positive (vX) | Compares the ratio of time the signature had a rightwards direction |
| Ratio Positive (vY) | Compares the ratio of time the signature had a upwards direction |
| Count Stop (vX) | Compares the ratio number of times the signature stopped or was going negligibly slowly to the right |
| Count Stop (vY) | Compares the number of times the signature stopped or was going negligibly slowly upwards |
| Velocity Deviation (vX) | Compares the standard deviation of left/right velocity |
| Velocity Deviation (vY) | Compares the standard deviation of up/down velocity |
| Mean to Max Ratio (vX) | Compares the ratio of the mean speed (right or left) over max |
| Mean to Max Ratio (vY) | Compares the ratio of the mean speed (up or down) over max |

If a user's signature does fit within an existing cluster, a number of actions can be taken. Examples include: the user can be notified that his signature does not match to another user's signature; the owner of the account can be notified that a user tried to access the asset whose signature didn't favorably compare to existing clusters; the user can be denied access to the asset; or all users can be denied access to the asset. Alternatively, no action might be taken, other than continued signature data collection.

Certain embodiments of the invention are also able to detect drifts, or changes, of the users' handwriting over a period of time, which may happen for example due to age, disability, or lack of practice as users communicate with keyboards in lieu of handwriting. Most drift happens because there is no limit on the cluster size, the data gets stale, and the task is something the user gets better at in time. In these embodiments the rules dynamically adjust if the user's handwriting changes over a period of time. Drift is detected because clusters have a maximal size, the timeframe may be relatively short, for example months or weeks, and the task selected (user's name) has low inter-task variability. The invention also handles abnormalities when the handwriting changes under certain conditions, for example when the user has had a couple of drinks or writing while performing another function.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. A method of verifying the identity of an authorized user comprising:
   a) displaying a first profile word to an authorized user;
   b) receiving the authorized user's handwriting input of the first profile word written on a touch screen device;
   c) measuring the features of the authorized user's handwriting input;
   d) storing the authorized user's handwriting features;
   e) displaying a challenge word to a first user;
   f) receiving the first user's handwriting input of the challenge word written on a touch screen device wherein the input comprises handwriting features;
   g) measuring the features of the first user's handwriting input;
   h) comparing the first user's handwriting features to the authorized user's handwriting features;
   i) determining a rating of similarity of the first user's handwriting features to the authorized user's handwriting features; and
   j) if the rating is in a predefined range, verifying that the first user is the authorized user.

2. The method of claim 1 further comprising:
   a) displaying two or more additional profile words to an authorized user; and
   b) receiving the authorized user's handwriting input of the additional profile words written on a touch screen device.

3. The method of claim 2 wherein displaying the additional profile words and receiving the input of the additional profile words occurs within a single profile period.

4. The method of claim 2 wherein displaying the additional profile words and receiving the input of the additional profile words occurs over separate periods.

5. The method of claim 1 wherein comparing further comprises:
   a) determining one or more clusters defining the handwriting samples from the authorized user; and
   b) determining whether the first user's handwriting input belongs to one or more clusters.

6. The method of claim 1 wherein comparing further comprises employing a pseudo-clustering algorithm.

7. The method of claim 1 further comprising giving the first user access to an asset.

* * * * *